United States Patent
Teir et al.

(10) Patent No.: US 8,603,428 B2
(45) Date of Patent: Dec. 10, 2013

(54) METHOD OF PRODUCING CALCIUM CARBONATE FROM WASTE AND BY-PRODUCTS

(75) Inventors: Sebastian Teir, Espoo (FI); Sanni Eloneva, Espoo (FI); Hannu Revitzer, Espoo (FI); Ron Zevenhoven, Abo (FI); Justin Salminen, Pori (FI); Carl-Johan Fogelholm, Tkk (FI); Esko Poylio, Rovaniemi (FI)

(73) Assignees: Aalto University Foundation, Aalto (FI); Abo Akademi, Turku (FI); Rautaruukki Oyj, Helsinki (FI)

( * ) Notice: Subject to any disclaimer, the term of this patent is extended or adjusted under 35 U.S.C. 154(b) by 359 days.

(21) Appl. No.: 12/995,453

(22) PCT Filed: May 29, 2009

(86) PCT No.: PCT/FI2009/050455
§ 371 (c)(1),
(2), (4) Date: Mar. 4, 2011

(87) PCT Pub. No.: WO2009/144382
PCT Pub. Date: Dec. 3, 2009

(65) Prior Publication Data
US 2011/0139628 A1 Jun. 16, 2011

(30) Foreign Application Priority Data
May 30, 2008 (FI) ..................................... 20085524

(51) Int. Cl.
*C01F 11/18* (2006.01)

(52) U.S. Cl.
USPC ............. 423/430; 423/63; 423/157; 423/165; 423/432

(58) Field of Classification Search
USPC .............................. 423/63, 157, 165, 430, 432
See application file for complete search history.

(56) References Cited

U.S. PATENT DOCUMENTS 4,225,565 A    9/1980    Marukawa et al.

FOREIGN PATENT DOCUMENTS

| JP | 51109281 | 9/1976 |
| JP | 2005097072 | 4/2005 |
| RU | 2160786 C1 | 12/2000 |
| RU | 2176676 C1 | 12/2001 |

OTHER PUBLICATIONS

Kodama et al., "Development of a new pH-swing C02 mineralization process with a recyclable reaction solution", Energy, Pergamon Press, Oxford, GB vol. 33, No. 5, pp. 776-784, Mar. 4, 2008.
Database WPI Week, 197646, Thomson Scientific, London, GB, An 1976-85742X, 1976.
Teir et al., "Dissolution of steelmaking slags in acetic acid for precipiated calcium carbonate production", Energy, Pergamon Press, Oxford, GB, vol. 32, No. 4, pp. 528-539 Dec. 22, 2006.
Eloneva et al., "Production of precipitated cacium carbonate from industrial by-product slags", Helsinki University of Technology, pp. 11-34, Nov. 30, 2007.

*Primary Examiner* — Stuart Hendrickson
(74) *Attorney, Agent, or Firm* — Birch, Stewart, Kolasch & Birch, LLP

(57) ABSTRACT

The present invention concerns a method for producing calcium carbonate containing the steps of extraction of alkaline industrial waste or by-products using as a first extraction solvent an aqueous solution of a salt formed from a weak acid and a weak base, whereby a vanadium-enriched first residue is allowed to settle and a calcium-rich first filtrate is formed, filtration, whereby the first filtrate is separated from the first residue, carbonation of the calcium-rich first filtrate using a carbonation gas, whereby calcium carbonate precipitates and a second filtrate is formed, and a second filtration, whereby the calcium carbonate is separated from the second filtrate. Further, the present invention concerns a method for extracting calcium carbonate and vanadium from alkaline industrial waste or by-products.

12 Claims, 4 Drawing Sheets

METHOD OF PRODUCING CALCIUM CARBONATE FROM WASTE AND BY-PRODUCTS

This Application is the National Phase Under 35 U.S.C. §371 of PCT International Application No. PCT/FI2009/050455, which has an International filing date of May 29, 2009, which claims priority to Finnish Patent Application No. 20085524 filed on May 30, 2008. The entire contents of all applications listed above are hereby incorporated by reference.

BACKGROUND OF THE INVENTION

1. Field of the Invention

The present invention concerns a method for producing calcium carbonate from alkaline industrial waste or by-products, as well as a method for extracting calcium carbonate and vanadium from the mentioned waste or by-products.

2. Description of Related Art

Iron and steel manufacturing is one of the biggest industries in the world, producing annually more than one billion metric tons of steel. Large amounts of slag are produced as a by-product from iron- and steelmaking processes (annually 300-400 million metric tons worldwide). Current uses for steelmaking slag are cement aggregate, road construction, fertilizers, and liming material. The steel industry also accounts for approximately 6-7% of the total anthropogenic $CO_2$ emissions to the atmosphere. The slag does, however, contain many components, such as Ca, Si, Fe, Mg, Al, Mn, V, and Cr, which could be valuable when separated from the rest of the slag.

Synthetic calcium carbonate, or precipitated calcium carbonate (PCC), is today produced by three different processes: a lime-soda process, a calcium chloride process, and a calcination/carbonation process. In the lime-soda process, calcium hydroxide is reacted with sodium carbonate to produce a sodium hydroxide solution, from which the calcium carbonate is precipitated. In the calcium chloride process, calcium hydroxide is reacted with ammonium chloride, forming ammonia gas and a calcium chloride solution. After purification, this solution is reacted with sodium carbonate to form a calcium carbonate precipitate and a sodium chloride solution. In the third, and most commonly used, production process, calcium oxide is hydrated with water, producing a calcium hydroxide slurry. The slurry is reacted with a $CO_2$-rich flue gas, from which the calcium carbonate is precipitated.

The common PCC production processes require calcium oxide or -hydroxide as raw material, which is typically produced by calcining (i.e. burning) limestone, and causes significant $CO_2$ emissions. The virgin limestone used also needs to have low levels of impurities in order to affect the quality of the PCC.

The prior art contains some examples of processes for separating various components from alkaline industrial waste or by-products, such as iron- and steelmaking slag. An example is the separation of alkali metals from the slag by converting them into carbonates using carbon dioxide ($CO_2$) gas in water. This procedure is described, for example, in U.S. Pat. No. 4,225,565, EP 0263559, U.S. Pat. No. 5,466,275 and JP 57111215.

Further, JP 2005097072 provides a method for manufacturing an alkaline earth metal carbonate, wherein a gas containing carbon dioxide is contacted with an aqueous solution containing an alkaline earth metal and a salt of a weak base and a strong acid.

KR 20040026382 provides a method for manufacturing calcium carbonate using desulphurized slag and carbon dioxide or a $CO_2$-containing exhaust gas. In this method, the desulphurized slag is added to water, the pH is adjusted to ≥12 and the obtained calcium-eluted solution is reacted with $CO_2$ or a $CO_2$-containing exhaust gas under a pH of ≥7.

JP 2007022817 provides a method of treating a steelmaking slag, wherein CaO present in the steelmaking slag is carbonated using a $CO_2$-gas.

SUMMARY OF THE INVENTION

It is an aim of the present invention to provide means for efficient utilization of alkaline industrial waste or by-products and carbon dioxide ($CO_2$)-rich flue gases.

Particularly, it is an aim of the present invention to provide a method for extracting calcium and other metals from the mentioned waste or by-products using mild conditions, and a method for producing marketable calcium carbonate with lower carbon dioxide emissions than in many current calcium carbonate production methods.

These and other objects, together with the advantages thereof over known methods, are achieved by the present invention, as hereinafter described and claimed.

In the present invention, a new method for producing calcium carbonate is presented, which method eliminates the need for mining and burning limestone and makes use of alkaline industrial waste or by-products, such as iron- and steelmaking slags (including blast furnace slag, steel converter slag, desulphurization slag, and ladle slag). The method also has the potential to consume a substantial amount of the $CO_2$-containing flue gases from such industry. Further, it raises the concentration of valuable metals, such as vanadium, which can subsequently be extracted from the waste or by-product.

Thus, the present invention concerns a method for producing calcium carbonate, as well as a method for extracting calcium carbonate and vanadium from alkaline industrial waste or by-products.

More specifically, the method of the present invention for producing calcium carbonate is characterized by what is stated in claim 1.

Further, the method of the present invention for extracting calcium carbonate and vanadium is characterized by what is stated in claim 3.

Considerable advantages are obtained by means of the invention. Thus, the present invention provides a new process, wherein low-cost industrial by-products can be used as raw materials instead of virgin limestone. Therefore, no mining or transportation of limestone is required. Further, the energy intensive limestone calcinations are omitted in this process, reducing $CO_2$ emissions.

The $CO_2$ concentration in the flue gases, for example, from an iron and steel plant can also be effectively reduced, reducing the local $CO_2$ emissions of the plant. For instance, by carbonating the iron- and steelmaking slags produced locally at steel mills, the carbon dioxide emissions of an individual steel mill could be reduced by 8-21% (based on a study considering Finnish steel plants).

Also other valuable and/or toxic elements, such as vanadium, can be more easily extracted from the calcium-depleted residual product. This gives an additional benefit as valuable metals can be produced and toxic elements removed, which could make the residual product less harmful to the environment than fresh waste or by-product and better suitable for technical applications.

Next, the invention will be described more closely with reference to the attached drawings and a detailed description.

DETAILED DESCRIPTION OF THE INVENTION

The present invention concerns a method for producing calcium carbonate from alkaline industrial waste or by-products, such as an iron- and steelmaking slag, while raising the concentration of valuable metals, such as vanadium, in the waste or by-product, which can subsequently be extracted therefrom.

According to an embodiment of the present invention, the method contains the steps of (FIG. 1):
a) Dissolution of alkaline industrial waste or by-products,
b) Filtration,
c) Carbonation of the residue, and
d) Filtration.

According to this embodiment, the dissolution step is carried out by extracting with an aqueous salt solution of a salt formed from a weak acid and a weak base. The weak base is preferably ammonia. Most preferably, the salt is ammonium acetate ($CH_3COONH_4$).

Using this method, calcium carbonate is obtained as a precipitate after the carbonation and the subsequent filtration.

According to another embodiment of the present invention, the method contains further steps, wherein the first residue obtained in the dissolution step a) is treated in order to extract vanadium. According to this embodiment, the method contains the steps of (FIG. 1):
a) Dissolution of alkaline industrial waste or by-products,
b) Filtration,
c) Carbonation of the first residue,
d) Filtration,
e) Dissolution of first residue, and
f) Filtration.

According to this embodiment, the dissolution step is carried out by extracting with an aqueous salt solution, which preferably is an aqueous solution of an ammonium salt, more particularly an aqueous solution of ammonium acetate ($CH_3COONH_4$), ammonium chloride ($NH_4Cl$) or ammonium nitrate ($NH_4NO_3$) or another ammonium salt, most preferably ammonium acetate ($CH_3COONH_4$).

The alkaline industrial waste or by-product is preferably iron- and steelmaking slag, more preferably blast furnace slag, steel converter slag, desulphurization slag or ladle slag of the iron- and steelmaking industry.

Figure 1:
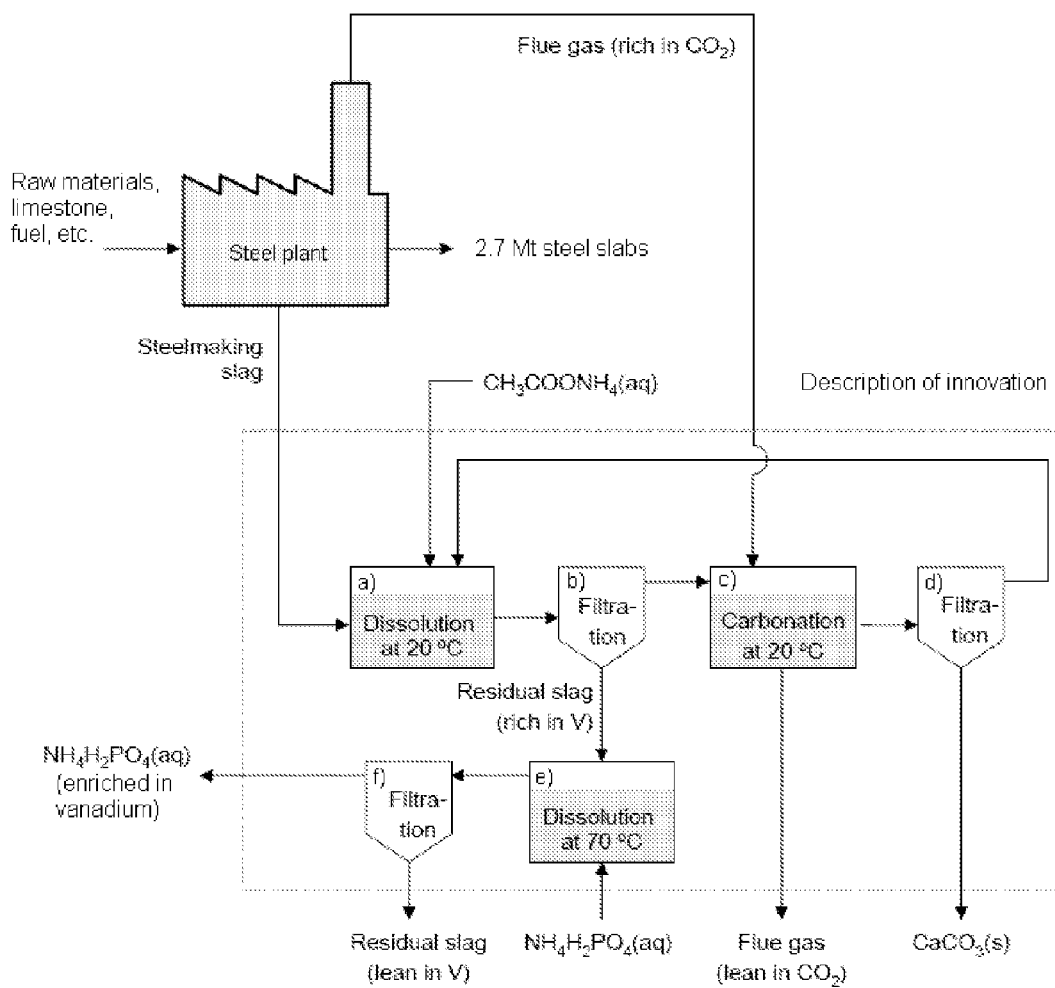
FIG. 1 is a process scheme presenting a preferred embodiment of the method of the present invention framed with a dashed, grey line.

According to the process scheme of FIG. 1, calcium is first selectively extracted from the alkaline industrial waste or by-products (step a), such as the iron- and steelmaking slag, using a first extraction solvent, at a temperature of 0-100° C., preferably 10-70° C., more preferably 10-30° C. Most preferably, the extraction takes place at room temperature, specifically at 20-25° C., using an aqueous salt solution. The salt concentration of the first extraction solvent is 0.2 to 5 M, preferably 0.5 to 2 M.

The extraction with ammonium acetate is presented in the following Equation 1:

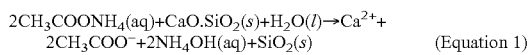

$$2CH_3COONH_4(aq)+CaO.SiO_2(s)+H_2O(l) \rightarrow Ca^{2+}+2CH_3COO^-+2NH_4OH(aq)+SiO_2(s) \qquad \text{(Equation 1)}$$

wherein the alkaline industrial waste or by-product has been simplified as $CaO.SiO_2$, although calcium (and many other compounds) may exist in several different phases in these products. Through the extraction of step a), a vanadium-enriched first residue, such as a residual slag, is formed, and allowed to settle from a formed calcium-rich first filtrate.

The first filtrate generally contains 60-90% of the calcium present in the waste or by-products, preferably 65-85%.

The solid first residue is allowed to settle and form a sediment, which is separated from the solution, i.e. the first filtrate, preferably by filtration (step b).

A carbonation gas is then led to a carbonating reactor, where the gas is preferably bubbled through the calcium-rich first filtrate, or the first filtrate is sprayed into a gas scrubber functioning as a carbonating reactor, whereby calcium carbonate is precipitated (step c). The carbonation takes place at a temperature of 0-100° C., preferably 10-70° C., more preferably 10-30° C. Most preferably, the carbonation takes place at room temperature, specifically at 20-25° C., using a gas, which preferably is $CO_2$ or a $CO_2$-containing gas, most preferably $CO_2$-containing flue gas of the steel industry, as presented in the following Equation 2:

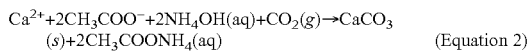

$$Ca^{2+}+2CH_3COO^-+2NH_4OH(aq)+CO_2(g) \rightarrow CaCO_3(s)+2CH_3COONH_4(aq) \qquad \text{(Equation 2)}$$

The precipitated calcium carbonate is allowed to settle and form a sediment, which is filtered from the formed second filtrate (step d). The second filtrate that is separated from the formed calcium carbonate may be recycled to step a) to be used as the first extraction solvent.

A minor amount of the first extraction solvent, for example an ammonium acetate solution, the amount generally being 0.1-1 wt-% of the entire amount of first extraction solvent, evaporates with the $CO_2$-lean carbonation gas and is thus conducted away from the carbonation of step c) together with a stream of $CO_2$-lean gas. According to a preferred embodiment of the present invention, this solvent is regenerated, for example by condensing it using a condenser, and can thus be recycled to step a), either separately or together with the second filtrate, whereas the gas stream may be conducted back to the stack.

The yield of calcium precipitated as calcium carbonate after performing steps a) to d) is generally 20-35% of the calcium present in the waste or by-products, preferably 24-30%.

After the calcium extraction (steps a to d), the concentration of other elements in the first residue is higher. Using proper solvents, several other elements can be extracted as well. Since the first residue is enriched in, for instance vanadium, the extraction of vanadium is particularly advantageous. Vanadium can be extracted from the vanadium-enriched first residue by dissolving it into a second extraction solvent (step e), which preferably is ammonium dihydrogen phosphate, as shown in the following Equation 3:

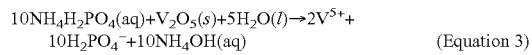
(Equation 3)

wherein the vanadium in the alkaline industrial waste or by-product is simplified as $V_2O_5$, although it can be present in several different compounds. The salt concentration of the second extraction solvent is 0.2 to 5 M, preferably 0.5 to 2 M. The dissolution of the vanadium is carried out at a temperature of 0-100° C., preferably 10-70° C., more preferably 10-30° C. Most preferably, the dissolution takes place at room temperature, specifically at 20-25° C. and results in the precipitation of a second residue, which is vanadium-lean, and in the formation of a third filtrate, which is enriched in vanadium. The precipitate and the filtrate may then be separated, for example by filtration.

The third filtrate contains 20-30% of the vanadium present in the industrial waste or by-product, preferably about 25%.

Metallic vanadium can be produced from this vanadium-enriched filtrate using, for example, electrolysis.

Although the preferable waste or by-product used in the present invention is iron- and steelmaking slag, other industrial residues or by-products containing one or more of calcium silicate, oxide and hydroxide are also potential raw materials for the process concept.

EXAMPLES

Example 1

Extraction of Calcium from Steel Converter Slag

Experiments were performed to test the extraction of calcium from steel converter slag. Batches of 1 g of the steel converter slag (74-125 μm) were dissolved in separate 50 ml aqueous solutions of respective ammonium salt solvent (acetate, nitrate and chloride) in concentrations of 0.5 M, 1 M and 2 M in sealed Erlenmeyer flasks. Each experiment was performed three times to increase the reliability and repeatability of the results. The solutions were stirred at 100 rpm at room temperature (20° C.), and 1 h after the addition of the slag filtered using 0.45 μm filters. The concentrations of Ca, Si, Fe, Mg, Al, Mn, V, and Cr (the main elements in steel converter slag) were measured in the filtered solutions with Inductively Coupled Plasma-Atomic Emission Spectrometry (ICP-AES). The steel converter slag fraction used was also analyzed using total digestion and ICP-AES, and a sample of the batch was sent for X-Ray Fluorescence (XRF) and X-Ray Diffraction (XRD)-analysis.

Figure 2:
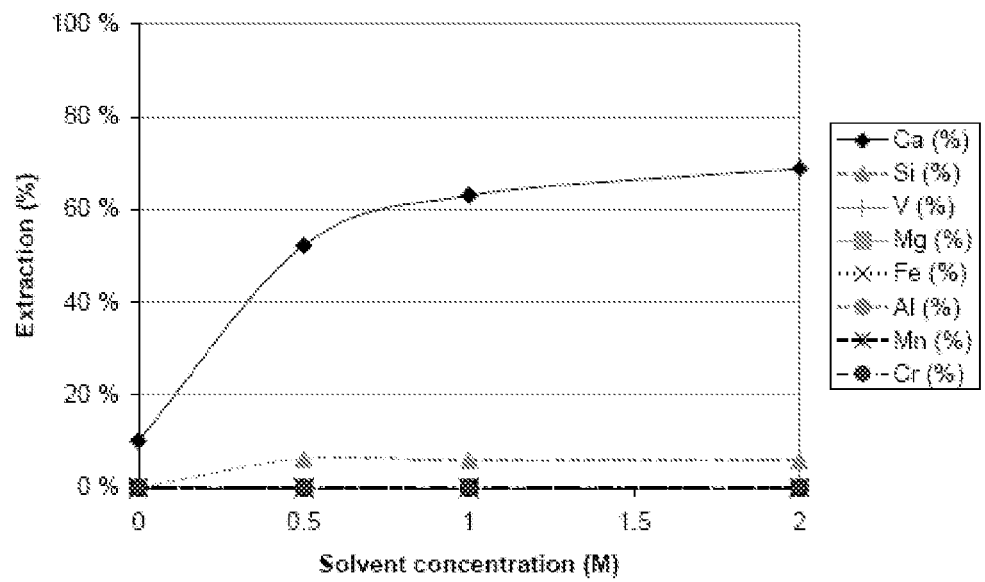
FIG. 2 is a graphical presentation of the dissolution of a steel converter slag in ammonium acetate.
Figure 3:
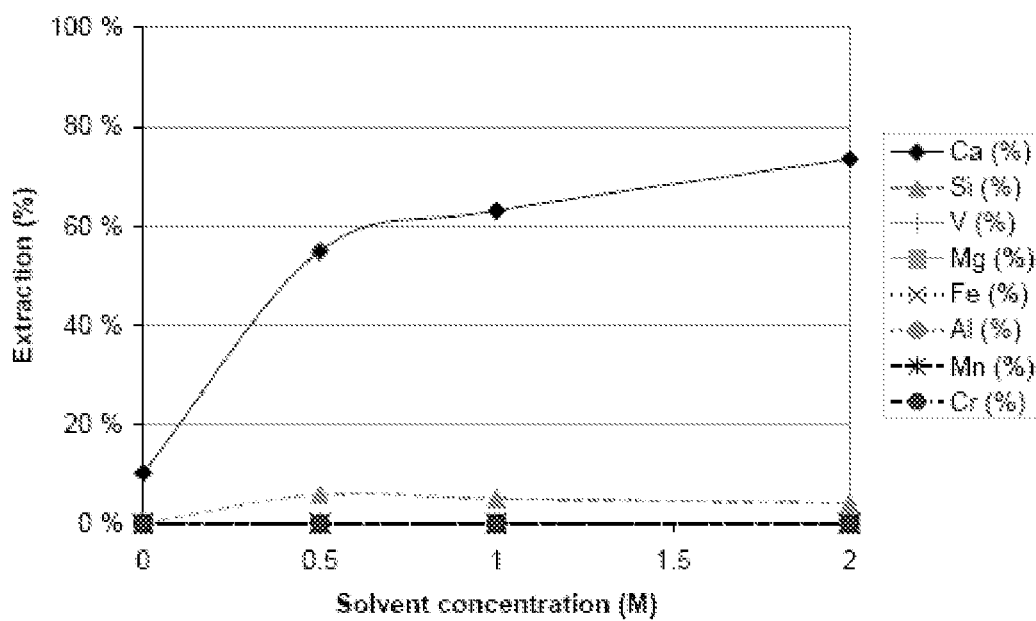
FIG. 3 is a graphical presentation of the dissolution of a steel converter slag in ammonium chloride.
Figure 4:
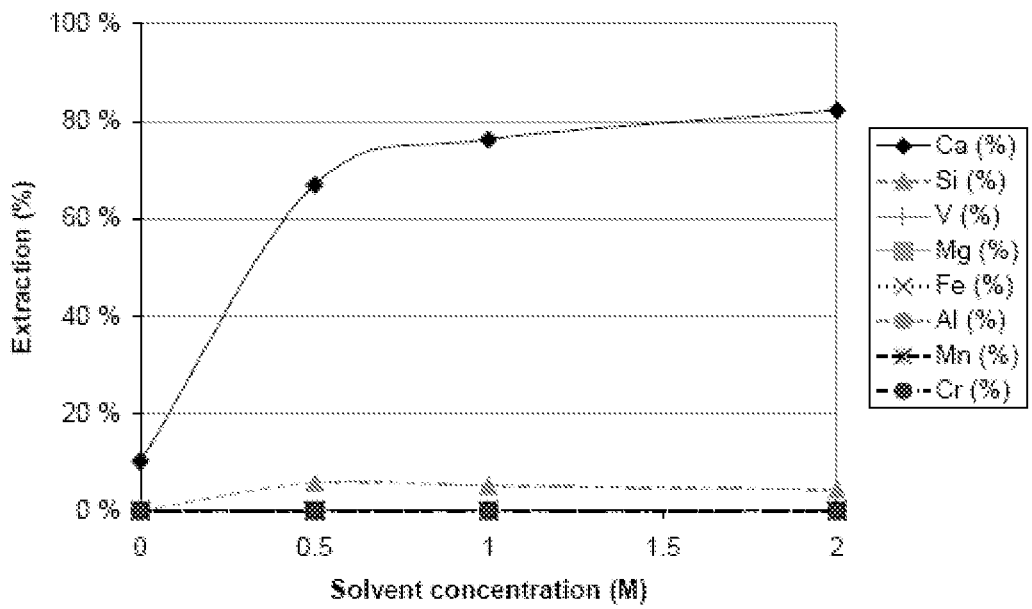
FIG. 4 is a graphical presentation of the dissolution of a steel converter slag in ammonium nitrate.

The results show that, while only 10% of the calcium in the steel converter slag was extracted using distilled water, a 2 M aqueous solutions of ammonium acetate managed to extract 69% of the calcium (FIG. 2). Further, aqueous solutions of 2 M ammonium nitrate or -chloride were able to extract 82% and 73%, respectively, of the calcium in the steel converter slag (FIGS. 3 and 4). The obtained concentrations of other elements were low: only up to 6% of silicon was extracted and an amount below the XRF analysis detection limit of the other measured elements.

Example 2

Extraction of Vanadium from Steel Converter Slag

Figure 5:
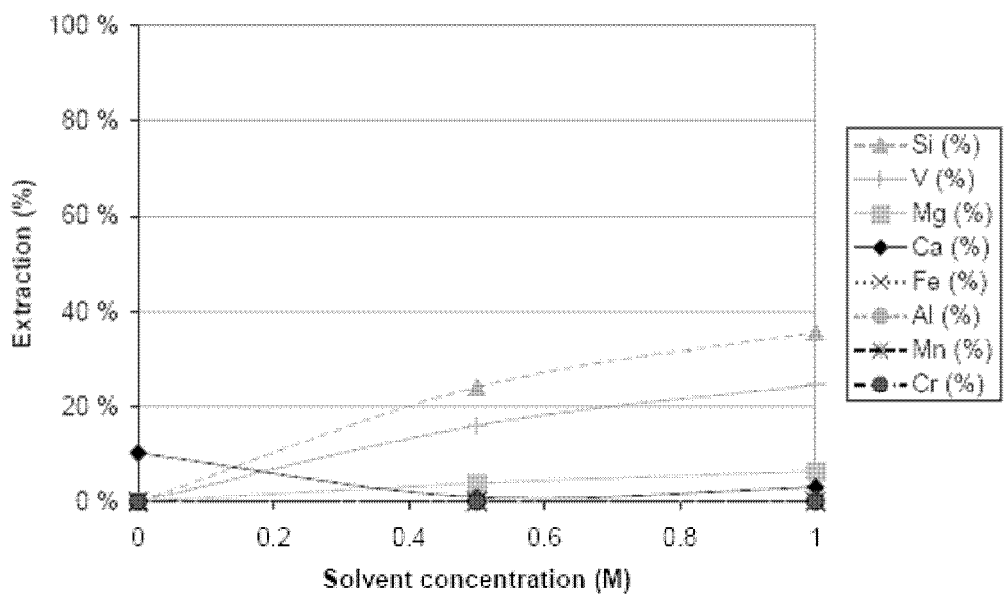
FIG. 5 is a graphical presentation of the dissolution of a steel converter slag in ammonium dihydrogen phosphate.
Figure 6:
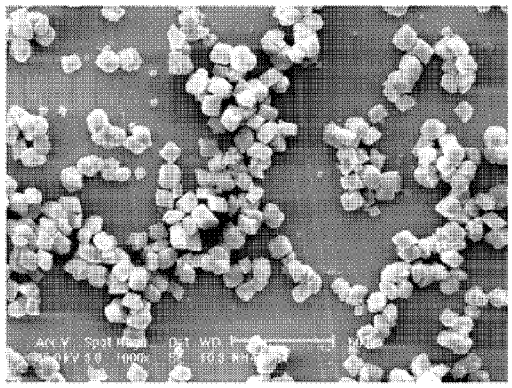
FIG. 6 is a Scanning Electron Microscope (SEM) picture of a calcite produced at 30° C. using a solution prepared from $CH_3COONH_4$ and a steel converter slag.
Figure 7:
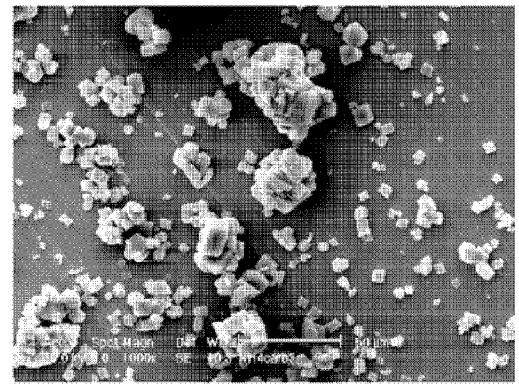
FIG. 7 is a Scanning Electron Microscope (SEM) picture of a calcite produced at 30° C. using a solution prepared from $NH_4NO_3$ and a steel converter slag.
Figure 8:
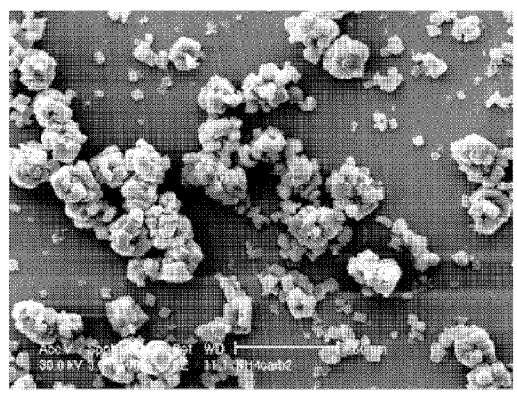
FIG. 8 is a Scanning Electron Microscope (SEM) picture of a calcite produced at 30° C. using a solution prepared from $NH_4Cl$ and a steel converter slag.
Figure 9:
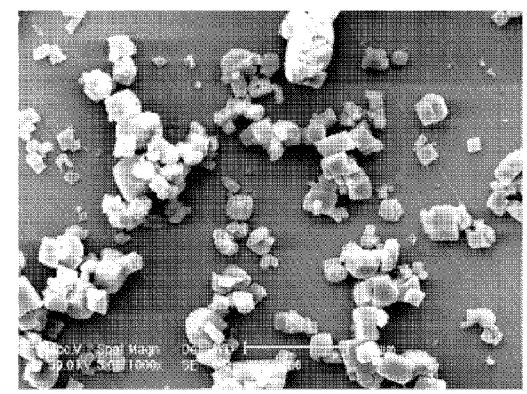
FIG. 9 is a Scanning Electron Microscope (SEM) picture of a calcite produced at 70° C. using a solution prepared from $NH_4NO_3$ and a steel converter slag.

Using a 1 M aqueous solution of ammonium dihydrogen phosphate and maintaining the temperature at room temperature (20° C.), 25% of the vanadium in the steelmaking slag was extracted (FIG. 5), leaving, however, most of the undissolved calcium. Further, 36% of the silicon dissolved into the solution, which means that the extraction of vanadium could be performed at elevated temperatures, such as temperatures of 60-80° C., where dissolved silicon precipitates as silica gels, leaving a large concentration of vanadium in the solution. Therefore, using ammonium dihydrogen phosphate, selective extraction of vanadium is possible.

Example 3

Carbonation

Carbonation of aqueous solutions containing ammonium salts and calcium dissolved from steel converter slag was tested at 30° C. and 70° C. The experiments were performed in a glass reactor (1000 ml), which was heated by a temperature-controlled water bath. The reactor was connected to a tap-water condenser to prevent losses due to evaporation of solvent from the solution. The solution temperature and the pH were continuously monitored. The solution was stirred at 600-700 rpm using a magnetic stirrer. After heat-up to the desired temperature under nitrogen flow (bubbled through the solution at 1 l/min), the nitrogen flow was replaced with a carbon dioxide gas flow (1 l/min). After 70 minutes of continuous exposure to the carbon dioxide flow, the reactor was removed from the bath and the solution was filtered using 0.45 μm membranes. The precipitate was washed and dried at 115-120° C. overnight. The precipitates were analyzed using XRD, XRF, Total Carbon (TC) and Scanning Electron Microscope (SEM).

Soon after the nitrogen flow had been replaced with the carbon dioxide flow, the solution turned from clear to white. The XRD analysis of the washed and filtered precipitates showed that they consisted of calcium carbonate in the form of calcite. No other phase was visible in the XRD spectra. The XRF and TC analysis confirmed that the major elements of the precipitates were Ca and C. The sum of other components identified by XRF amounted to only 0.14-0.21 wt-% of the precipitates, indicating that the purity of the calcite produced was 99.8%. The SEM pictures of the precipitates (FIGS. 6, 7, 8 and 9) showed that the precipitates were in the form of rhombohedral calcite with a diameter of about 5-30 μm. Although the calcite favored for paper filler applications is typically smaller and has a scaleohedral (hexagonal) form, the form of the precipitate is typically adjusted by varying process parameters.

The total conversion of calcium in the slag to precipitated calcium was 28-29% using solutions prepared from $NH_4Cl$ and $NH_4Ac$, while the conversion was 24% using a solution prepared from $NH_4NO_3$.

The invention claimed is:
1. A method for producing calcium carbonate and vanadium comprising the steps of;
a) extracting alkaline industrial waste and by-products using as a first extraction solvent an aqueous solution of a salt formed from a weak acid and a weak base, whereby a first residue is allowed to settle and a calcium-rich first filtrate is formed, b) filtering, whereby the first filtrate is separated from the first residue, c) carbonation of the calcium-rich first filtrate using a carbonation gas, whereby calcium carbonate precipitates and a second filtrate is formed, d) filtering, whereby the calcium carbonate is separated from the second filtrate, e) dissolving the first residue using a second extraction solvent, whereby a vanadium-lean second residue is allowed to settle and a vanadium-rich third filtrate is formed, and f) filtering, whereby the second residue is separated from the third filtrate.

2. The method of claim 1, wherein the first extraction solvent is an aqueous solution of ammonium acetate ($CH_3COONH_4$).

3. The method of claim 1, wherein the second extraction solvent is an aqueous solution of ammonium dihydrogen phosphate.

4. The method of claim 1, wherein the alkaline industrial waste or by-product is iron- and steelmaking slag selected from the group of blast furnace slag, steel converter slag, desulphurization slag and ladle slag of the iron- and steelmaking industry.

5. The method of claim 1, wherein the gas used in the carbonation is $CO_2$, a $CO_2$-containing gas, or a $CO_2$-containing flue gas of the iron- and steelmaking industry.

6. The method of claim 1, wherein the carbonation is carried out by bubbling the carbonation gas through the first filtrate or by spraying the filtrate into a flue gas scrubber.

7. The method of claim 1, wherein a stream of $CO_2$-lean gas, used for carbonation, is conducted away from the carbonation step, which stream of $CO_2$-lean gas contains a minor amount of evaporated first extraction solvent, which solvent is condensed and recycled to step a) to be used as the first extraction solvent.

8. The method of claim 1, wherein the second filtrate separated from the formed calcium carbonate in step d) is recycled to step a) to be used as first extraction solvent.

9. The method of claim 1, wherein steps a and e) are carried out at a temperature of 10-90° C.

10. The method of claim 1, wherein the vanadium-enriched third filtrate is subjected to electrolysis to produce metallic vanadium.

11. The method of claim 9, wherein steps a), c) and e) are carried out at 20-70° C.

12. The method of claim 9, wherein steps a), c) and e) are carried out at 20-25° C.

* * * * *